(12) United States Patent
Strecker

(10) Patent No.: US 6,935,534 B2
(45) Date of Patent: *Aug. 30, 2005

(54) MIXING ROTARY POSITIVE DISPLACEMENT PUMP FOR MICRO DISPENSING

(75) Inventor: Timothy D. Strecker, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/717,139

(22) Filed: Nov. 18, 2003

(65) Prior Publication Data

US 2004/0099698 A1 May 27, 2004

Related U.S. Application Data

(63) Continuation of application No. 10/059,673, filed on Jan. 28, 2002, now Pat. No. 6,691,895.

(51) Int. Cl.[7] .................................................. B67D 5/60
(52) U.S. Cl. ............................ 222/145.1; 222/145.6; 222/261; 222/413; 222/504
(58) Field of Search ........................ 222/145.6, 145.5, 222/145.1, 63, 137, 260–261, 256, 504, 410–413, 309, 282; 141/105, 107

(56) References Cited

U.S. PATENT DOCUMENTS

| | | |
|---|---|---|
| 3,165,785 A | 1/1965 | Hehl |
| 3,184,112 A | 5/1965 | Loeser |
| 3,390,814 A | 7/1968 | Creighton, Jr. et al. |
| 3,901,409 A | 8/1975 | Bradley et al. |
| 3,932,136 A | 1/1976 | Stickney |
| 4,407,431 A | 10/1983 | Hutter |
| 4,979,942 A | * 12/1990 | Wolf et al. .................... 604/83 |
| 4,986,443 A | * 1/1991 | Saur et al. ...................... 222/1 |
| 5,080,264 A | 1/1992 | Limper |
| 5,265,773 A | 11/1993 | Harada |
| 5,439,147 A | 8/1995 | Bitschnau |
| 5,564,606 A | 10/1996 | Engel |

(Continued)

FOREIGN PATENT DOCUMENTS

| | | |
|---|---|---|
| DE | EP-0313519 A1 | 4/1989 |
| EP | 0514770 A1 | 11/1992 |
| WO | WO01/30488 A2 | 10/2000 |
| WO | WO01/30488 A3 | 10/2003 |

OTHER PUBLICATIONS

"High Resolution Mixer for the Study of the Kinetics of Rapid Reactions in Solution' from "The Review of Scientific Instruments' vol. 39, No. 4; Apr. 1968; pp 493–498.

'High Speed Optical Stopped–Flow Apparatus' from "The Review of Scientific Instruments" vol. 39, No. 4; Apr. 1968; pp 486–493.

*Primary Examiner*—Frederick C. Nicolas
(74) *Attorney, Agent, or Firm*—Donald J. Coulman (57) ABSTRACT

A dispensing apparatus, which is capable of delivering precise quantities of a liquid product less than one mm$^3$ in size, includes a drive mechanism, a housing made up of at least two input channels coupled to a chamber made up of a first portion and a second portion. First and second component liquids are delivered via the first and second input channels respectively to the chamber and the first and second input channels are disposed so that interaction is hindered between the first component liquid and the second component liquid in either input channel. At least one feed screw with a helical thread is disposed in the chamber such that when the at least one feed screw is rotated by the drive mechanism the first and second component liquids are mixed to form a liquid product and the feed screw rotation also discharges the liquid product from the chamber.

14 Claims, 11 Drawing Sheets

U.S. PATENT DOCUMENTS

| | | |
|---|---|---|
| 5,593,290 A | 1/1997 | Greisch et al. |
| 5,655,692 A | 8/1997 | Navin |
| 5,819,983 A | 10/1998 | White et al. |
| 5,857,589 A | 1/1999 | Cline et al. |
| 5,862,957 A | 1/1999 | Nuttall |
| 5,887,755 A * | 3/1999 | Hood, III .................. 222/135 |
| 5,927,560 A | 7/1999 | Lewis et al. |
| 5,931,355 A | 8/1999 | Jefferson |
| 5,971,227 A | 10/1999 | White et al. |
| 5,992,688 A | 11/1999 | Lewis et al. |
| 6,070,764 A | 6/2000 | Cline et al. |
| 6,126,039 A | 10/2000 | Cline et al. |
| 6,202,894 B1 | 3/2001 | Struminski et al. |
| 6,234,358 B1 | 5/2001 | Romine et al. |
| 6,253,972 B1 | 7/2001 | DeVito et al. |
| 6,386,396 B1 * | 5/2002 | Strecker .................... 222/261 |
| 6,691,895 B2 * | 2/2004 | Strecker ................. 222/145.1 |

* cited by examiner

MIXING ROTARY POSITIVE DISPLACEMENT PUMP FOR MICRO DISPENSING

This is a continuation of Application Ser. No. 10/059,673, filed on Jan. 28, 2002, now U.S. Pat. No. 6,691,895.

BACKGROUND OF THE INVENTION

This invention relates generally to positive displacement dispensing apparatuses for dispensing precise quantities of a liquid product less than one mm³ in size. More particularly, the present invention relates to a dispensing apparatus having a least two input channels enabling the dispensing of multi-component liquids utilizing a feed screw to both mix the components and dispense the liquid product.

The ability to dispense a minute, precise quantity of liquid such as an adhesive, a conductive epoxy, a two part adhesive, or a solder paste at precise locations on a surface is critical to a number of manufacturing processes, especially in the electronics industry. The assembly of circuit boards, hard disk drives, inkjet cartridges, and flat panel displays are just a few examples. During normal operation, it is important to both achieve and maintain high repeatability in the dispensing quantity inspite of variations in temperature, viscosity, or both.

For some applications, the liquid dispensed is extremely sensitive to such changes, this is especially true where the dispensed liquid has a relatively high viscosity which itself varies as the temperature changes. This can result in changes in the volume of material dispensed over time. An example of this type of problem is in the encapsulation of integrated circuits where typically a two-part epoxy is premixed by the epoxy manufacturer and frozen. The premixed epoxy then must be shipped and then stored in this frozen state. When the buyer is ready to utilize the epoxy it must first be thawed and then used typically within a few days, and in some instances within several hours. Thus, during normal operation the viscosity will change, both due to temperature variation as well as the two components reacting creating variation in dispensed volume over time. This is true especially for those dispensers which utilize pneumatically actuated time/pressure dispensing mechanisms.

In addition, there are also problems relating to the entrapment of air within the liquid to be dispensed because small gas bubbles in the liquid compress, causing sputtering and inaccuracies in the volume of material dispensed. Another problem is the constant almost continuous use that these dispensers can experience when operated under typical conditions on a high volume assembly line. If the material being dispensed hardens or degrades then the valve has to be cleaned and this can be a difficult operation, sometimes requiring the dispensing system to be return to the supplier for reconditioning which results either in higher cost requiring additional systems on hand, or else down time of the assembly line. The ability to rapidly and easily replace those portions of the dispenser which come in contact with the dispensing liquid is very advantageous.

Current dispenser technology for adhesives that are packaged as two parts (ie. resin and hardner for two part epoxies) typically utilize static mixing to blend the resin and hardner together and then dispense the mixture directly to the bondline (i.e. onto the surface desired). A static mixer consists of immovable blades in a short cylindrical tube that facilitate dispersive mixing of the two parts as they exit there respective reservoirs. This technology works well for dispense rates in the milliliter to liter per second range typically used in the automotive and aerospace industries in which the accuracy of dispensed volume is not as critical due to part dimension constrains.

For dispense rates in the microliter per second range typically used in electronic and semiconductor manufacturing, the dispense accuracy is achieved using positive displacement dispenser technology. For this type of dispenser, to obtain the desired accuracies required one uses a single feed screw to convey the adhesive in a known volume for each turn of the feed screw. Thus, the dispensed volume can be accurately controlled by the feed screw motor speed. For systems that use a static mixer, the control typically is pneumatic pressure pushing the adhesive through the mixer. Due to the viscoelastic behavior of most adhesives, controlling the dispense rate and dispense end point when dispensing a bead is difficult. Static mixers can deliver flow rates in the microliter per second range, but typically not with the same accuracy as a positive displacement type pump. Currently the ability to utilize positive displacement pump technology for adhesives that are packaged as two parts, typically requires the addition of a static mixture to blend the resin and hardner together and then feed the blended mixture through a single input channel for dispensing by the feed screw of the positive displacement pump. Thus, there is a need to both blend the resin and hardner together and dispense the adhesive utilizing a single dispensing mechanism.

SUMMARY OF THE INVENTION

A dispensing apparatus, which is capable of delivering precise quantities of a liquid product less than one mm³ in size, includes a drive mechanism, a housing made up of at least two input channels coupled to a chamber made up of a first portion and a second portion. First and second component liquids are delivered via the first and second input channels respectively to the chamber and the first and second input channels are disposed so that interaction is hindered between the first component liquid and the second component liquid in either input channel. At least one feed screw with a helical thread is disposed in the chamber such that when the at least one feed screw is rotated by the drive mechanism the first and second component liquids are mixed to form a liquid product and the feed screw rotation also discharges the liquid product from the chamber.

DETAILED DESCRIPTION

Figure 1:
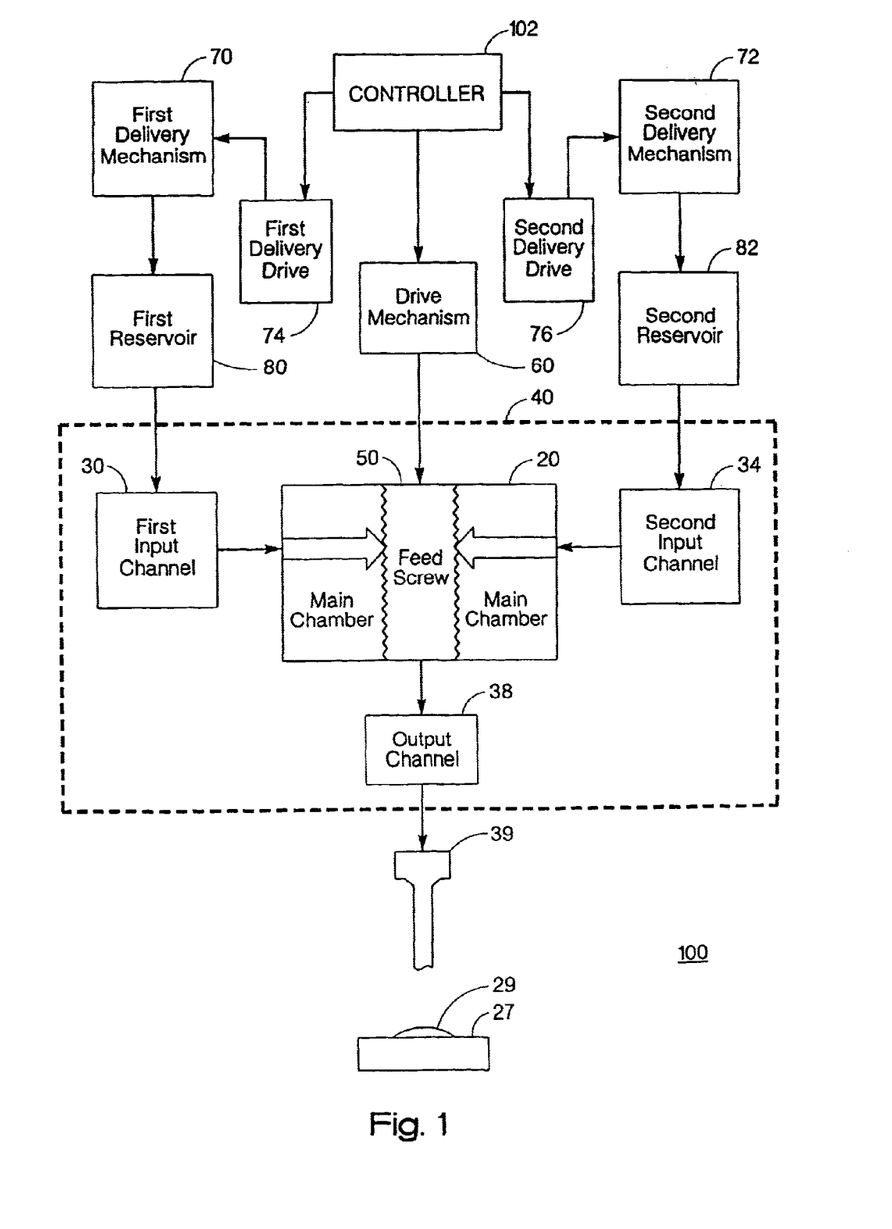
FIG. 1 is a block diagram of a dispensing apparatus according to an embodiment of this invention.

FIG. 1 schematically illustrates a viscoelastic liquid dispenser referred to as dispensing apparatus 100. Dispensing apparatus 100 mixes two different liquid components to form a liquid product and accurately dispenses a predetermined amount of the viscoelastic liquid product onto surface 27 in a manufacturing process, utilizing feed screw 50 in chamber 20 to both mix and dispense. Examples of the viscoelastic liquids which can be dispensed are an adhesive, a conductive epoxy, underfill, solder paste or other material that typically has a viscosity of the order of 10,000 to 1,000,000 Centipoise. Dispensing apparatus 100 may be used to accurately dispense any one of the materials previously mentioned as isolated structures 29 commonly referred to as dots onto surface 27 of the order of 0.2 to 1.5 mm in diameter with a height of the order of 0.2 to 1.0 mm. Dispensing apparatus 100 may also be used to accurately dispense a bead of liquid product of the order of 0.2 to 1.5 mm in width and 0.2 to 1.0 mm in height at rates of the order of 0.4 to 0.8 milliliters per minute.

As shown in FIG. 1 dispensing apparatus 100 typically includes two reservoirs labeled as first reservoir 80 and second reservoir 82, each of which holds a different liquid component. First and second reservoirs 80 and 82 are coupled to first and second delivery mechanisms 70, 72 respectively. Delivery mechanisms 70, 72 preferably are syringe pumps, but those skilled in the art will readily recognize that numerous other delivery mechanisms may be utilized. Diaphragm pumps, piston pumps, or additional feed screws are a few examples of other delivery mechanisms that can also be utilized. Depending on the drive mechanism utilized, either first and second reservoirs or first and second delivery mechanisms are mounted to housing 40 and are coupled to first and second input channels 30, 34 respectively. First and second input channels 30,34 provide liquid communication to chamber 20 and output channel 38 provides liquid communication to dispenser tip 39.

Feed screw 50 slidably fits in chamber 20 and is rotated by drive mechanism 60. Thus, as feed screw 50 is rotated the threads of feed screw 50 forces both liquid components captured between the threads and the walls of chamber 20 to compress and move in the direction of output channel 38 causing mixing. When the liquid product formed from the mixing of the two components reaches dispenser tip 39 it is discharged onto surface 27 forming structure 29. The accurate control of the amount of rotation of feed screw 50 provides a precise control of the rate of feed and subsequent volume of liquid product dispensed. As liquid product is dispensed, an additional supply of both liquid components is provided by first and second delivery drives 74, 76 which activate first and second delivery mechanisms 70, 72. Controller 102 controls both delivery drives 74, 76 and drive mechanism 60.

The incorporation of two input channels 30, 34 connected to chamber 20 provides an advantage over dispensing systems having only one input channel by allowing the dispensing of two-part adhesives without the need for premixing, either using static mixers or frozen pre-mixed two part adhesives. This results in significantly lower costs, because the supplier can use bulk packaging compared to the custom syringes typically utilized. In addition, there is no longer a requirement for freezing thus reducing both shipping and handling costs. Further, the unmixed two part adhesives typically have a very long shelf life at room temperature compared to the frozen premixed materials thus reducing scrap costs as well. Finally the utilization of two input channels provides the user greater flexibility in formulation chemistries that enable low temperature curing, no filled systems, and very exothermic reacting materials which a supplier would be prohibited from shipping in a premixed frozen form.

Figure 2:
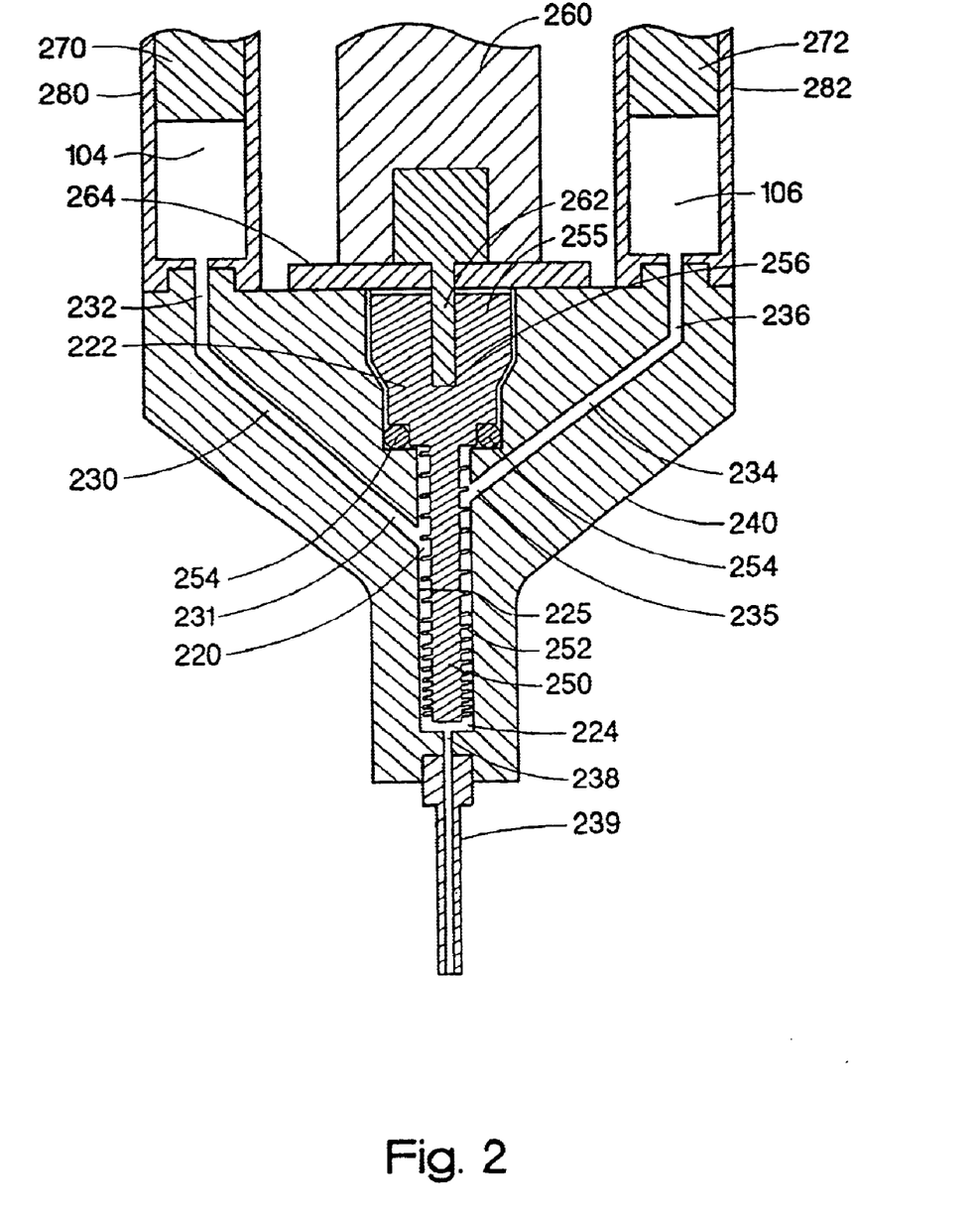
FIG. 2 is a cross-sectional view of a dispensing apparatus according to an embodiment of this invention.

Referring to FIG. 2, an embodiment of dispensing apparatus 100 of the present invention in a cross-sectional view is shown, where helical threads 252 extend over a substantial portion of the length of feed screw 250 beginning near drive coupling 255 and ending near second portion 224. Helical threads 252 have a diameter slightly less than the diameter of chamber 220, thus helical threads 252 are in sliding contact with side wall 225 of chamber 220. In addition, in this embodiment feed screw 250 has helical threads 252 with a relatively wide pitch near first portion 222 the threads becoming narrower and closer together as the threads approach second portion 224. Drive coupling 255 is formed at the end of feed screw 250 located in first portion 222. Internal drive socket 256 is formed in drive coupling 255 so that drive shaft 262 is received within internal drive socket 256 to provide rotational coupling between drive mechanism 260 and feed screw 250. In this embodiment drive mechanism 260 is preferably a servo motor or stepper motor which provides accurate control of the amount of rotation of feed screw 250. Drive bracket 264 mounts drive mechanism 260 to housing 240. Internal drive socket 256 preferably is square, rectangular, or hexagonal; however, those skilled in the art will appreciate that there are numerous other coupling mechanisms such as a screw coupling or keyed coupling as well as others, which can be utilized. Rotary seal 254 both, maintains feed screw 250 in a centered position with respect to chamber 220, and cooperates with, the opposing surface of side wall 225 of chamber 220 to form a seal to hinder liquid components from moving into first portion 222.

First and second reservoirs 280, 282 in this embodiment, are relatively large syringes, which are mounted to storage ends 232, 236 respectively of input channels 230 and 234. Preferably first and second reservoirs 280,282 are fifty to one hundred fifty milliliters in size, but may be larger or smaller depending on the particular application. First and second delivery mechanisms 270, 272 are pistons which are activated by first and second delivery drives, which are preferably low pressure air sources of 5–70 psi that is applied to urge viscoelastic first and second liquid components 104, 106 from reservoirs 280, 282 into input channels 230, 234 via storage ends 232, 236. Those skilled in the art will appreciate that if a source of low pressure air is not readily available, then other mechanisms commonly used to move a piston can be utilized, as for example a screw drive.

As shown in FIG. 2 second inlet end 235 of second inlet channel 234 opens into chamber 220 at a point closer to first portion 222 of chamber 220 than first inlet end 231 of first inlet channel 230. First inlet end 231 and second inlet end 235 are separated in a direction along the axis of the chamber that precludes interaction of first and second component liquids 104, 106 in either input channels 230, 234. Also shown in FIG. 2 is housing 240, which includes chamber 220, first and second inlet channels 230, 235 as a unitary construction. Those skilled in the art will appreciate that housing 240 can be constructed from multiple parts fastened together that provide proper liquid sealing at points where a liquid component flows from one part to another. Not shown in FIG. 2 is controller 202 which provides signals to control both first and second delivery drives 274, 276 which activate first and second delivery mechanisms 270, 272. Controller 202 also provides signals to control drive mechanism 260 for rotating feed screw 250.

Figure 3:
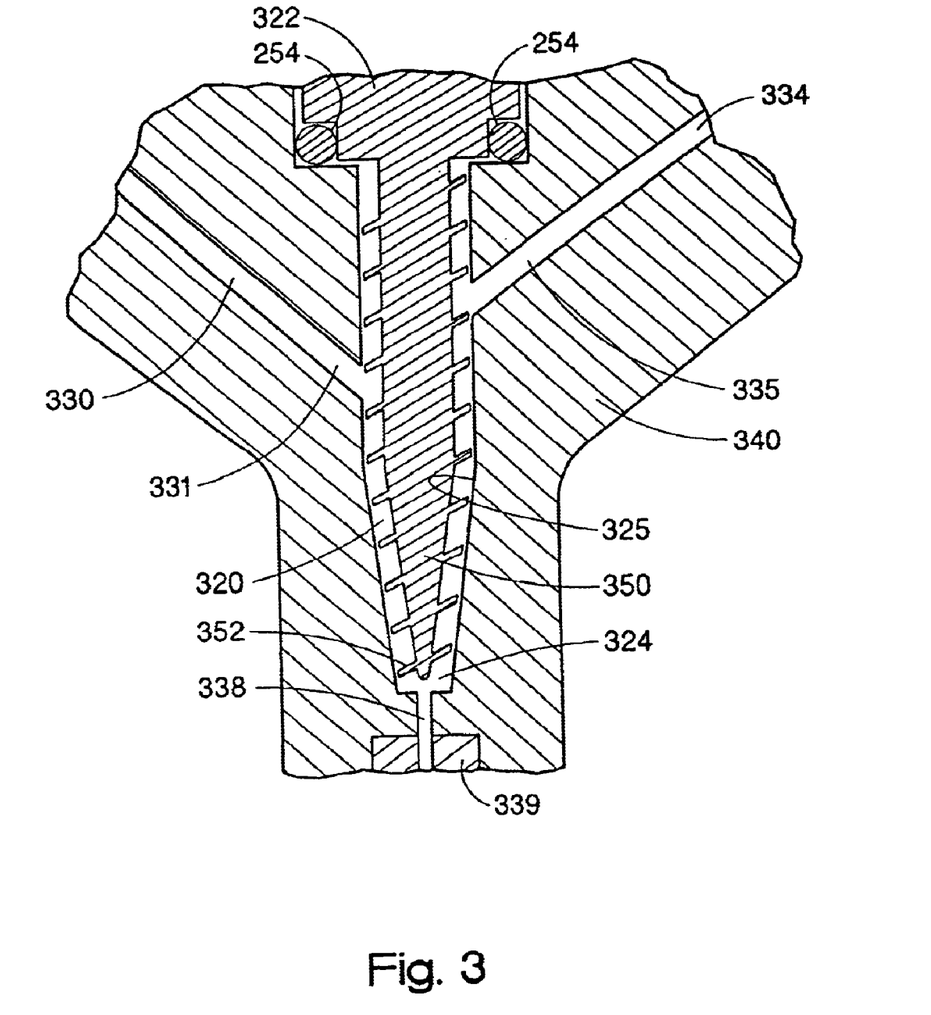
FIG. 3 is a cross-sectional view of a dispensing apparatus according to an embodiment of this invention.

In FIG. 2 feed screw 250 rotates within chamber 220, that has parallel side wall 225, helical threads 252 have a variable pitch which increases the pressure exerted on liquid components 104,106. An alternate embodiment of the present invention is shown in a cross-sectional view in FIG. 3 that functions in a similar manner as that shown in FIG. 2. In FIG. 3 feed screw 350 has a conic or tapered shape with helical threads 352 having a linear pitch. Finally, feed screw 250, can include sections with various configurations of helical threads. Those skilled in the art will appreciate that kneading threads, reverse threads, variable pitch thread, cylindrical sections with no threads all can be utilized in various combinations as well as numerous other thread designs.

When feed screw 350 is rotated helical threads 352 are in sliding contact with side wall 325 of chamber 320. The clearance between helical threads 352 and side wall 325 can be adjusted. As first and second liquid components 104, 106 are fed into chamber 320 at first and second inlet ends 331,335 the reduction in area created by the smaller diameter of the tapered shape produces a reduction in volume leading to an increase in pressure similar to that obtained with feed screw 250.

Figure 4:
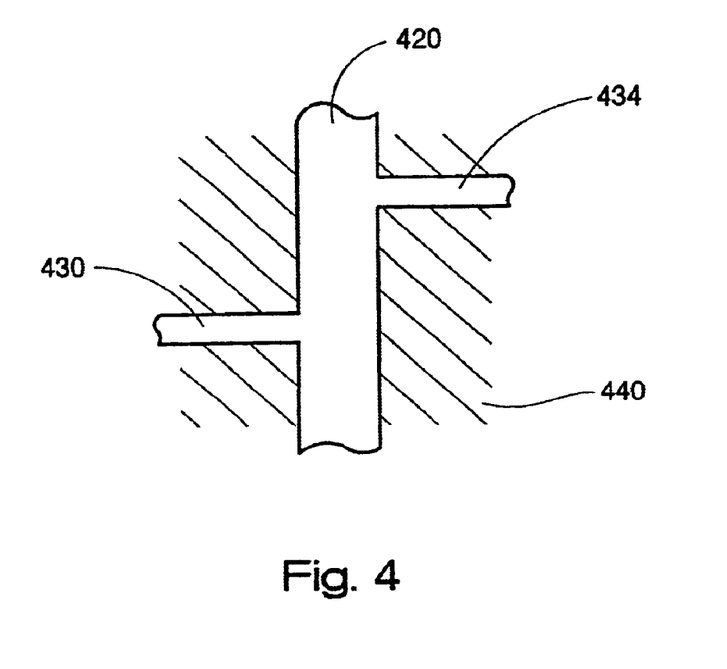
FIG. 4 is a cross-sectional view of the chamber and the input channels of a dispensing apparatus according to an embodiment of this invention.

Referring to FIG. 4 a cross-sectional view is shown of an alternate embodiment of the present invention where first and second input channels 430, 434 extend radially from chamber 420. First and second inlet channels 430, 434 are separated in a direction along the axis of chamber 420 to preclude the interaction of first and second component liquids 104, 106 from either input channel as first and second component liquids are fed into chamber 420 from first and second reservoirs 80,82.

Figure 5:
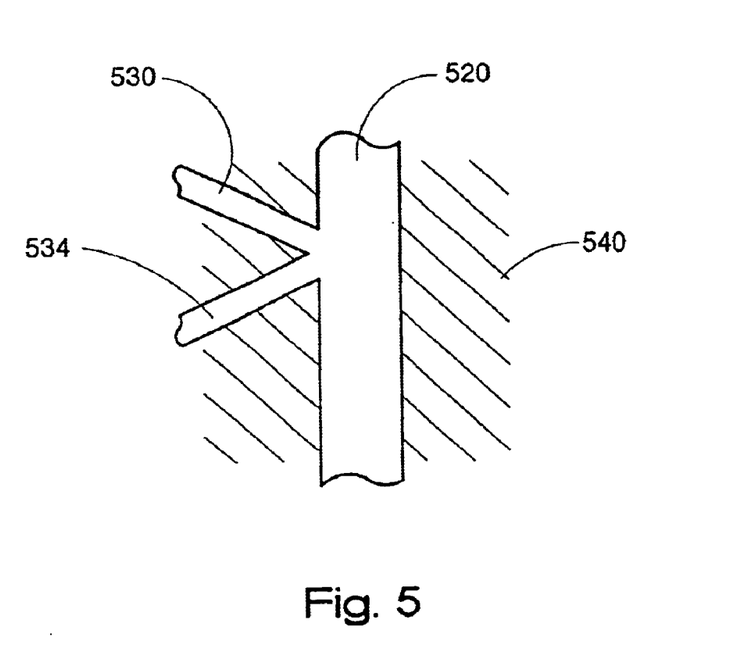
FIG. 5 is a cross-sectional view of the chamber and the input channels of a dispensing apparatus according to an embodiment of this invention.

Referring to FIG. 5 a cross-sectional view is shown of an alternate embodiment of the present invention, where first and second inlet channels 530, 534 are attached to chamber 520 at a common location. As shown in FIG. 5 the angle formed between the axes of input channels 530, 534 is acute. Preferably the angle is less than ninety degrees, however those skilled in the art will appreciate that an angle less than one hundred eighty degrees can be utilized depending on both the feed rates and pressure differential utilized to feed first and second component liquids 104, 106 to chamber 520. This embodiment is very advantageous in alleviating back flow problems for those applications which require a significant feed rate differential between the first and second component liquids 104, 106.

Figure 6A:
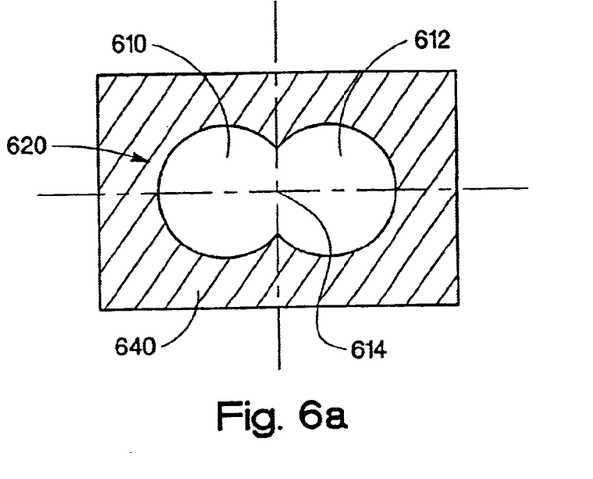
FIG. 6a is a cross-sectional view of the chamber according to an embodiment of this invention.
Figure 6B:
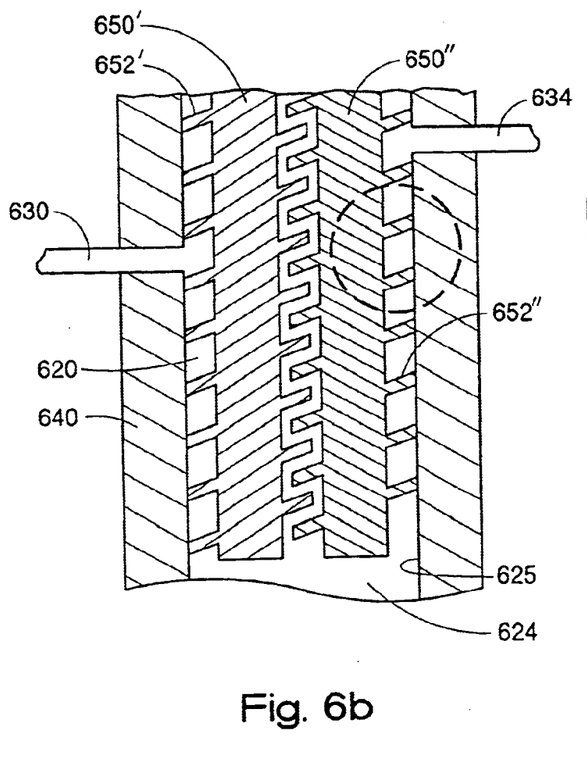
FIG. 6b is a cross-sectional view of the chamber according to an embodiment of this invention.
Figure 6C:
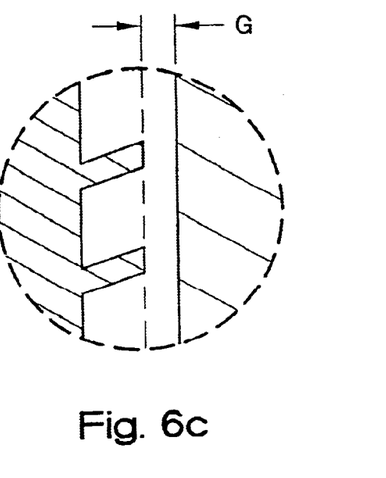
FIG. 6c is an expanded cross-sectional view of the chamber shown in FIG. 6b.

Referring to FIGS. 6a–6b an alternate embodiment of the present invention is shown, where two feed screws 650' and 650" are located within chamber 620. FIG. 6a shows a cross-sectional view of chamber 620 located in housing 640. In this embodiment, chamber 620 includes two circular bores 610 and 612 formed in housing 640 which have parallel axes and extend centrally and longitudinally through housing 640. Circular bores 610 and 612 communicate with each other along a common chord 614. Feed screws 650' and 650" are rotatably supported within circular bores 610 and 612 of chamber 620 and are in sliding contact with side wall 625 as shown in FIG. 6b. Preferably the gap G between helical threads 652', 652" and side wall 625 is of the order of 0.0001 to 0.0008 inches, but may be smaller or larger depending on the particular application, as shown in the expanded portion of FIG. 6b. Helical threads 652' and 652" in this embodiment are partly overlapping along chord 614. As feed screws 650', 650" are rotated helical threads 652', 652" are engaging each other in a meshing manner, as shown in FIG. 6b, causing first and second component liquids 104, 106 in the turns of helical threads 652' and 652" to move in the axial direction causing mixing and the dispensing of liquid product. The intermeshing of the helical threads 652' and 652" results in a volumetric transport of material. Feed screws 650', 650" can run in two modes: co-rotating and counter-rotating depending on screw design where typically co-rotating feed screws can be operated at higher speeds.

The incorporation of two feed screws 650', 650" in chamber 20 provides a dispenser which can dispense both, a wider range of viscosities, especially for materials at the low end of the viscosity range, as well as a when there is a large particle size variation. In addition, two feed screws provide improved mixing since the fluidic dynamics are much more complex. Thread configurations are also more flexible utilizing two feed screws. Further, when they are intermeshing, two feed screws are typically self-wiping (i.e. self cleaning). Finally, feed screws 650', 650" can include sections with various configurations of helical threads. Those skilled in the art will appreciate that kneading threads, reverse threads, variable pitch thread, cylindrical sections with no threads all can be utilized in various combinations as well as numerous other thread designs.

Figure 7A:
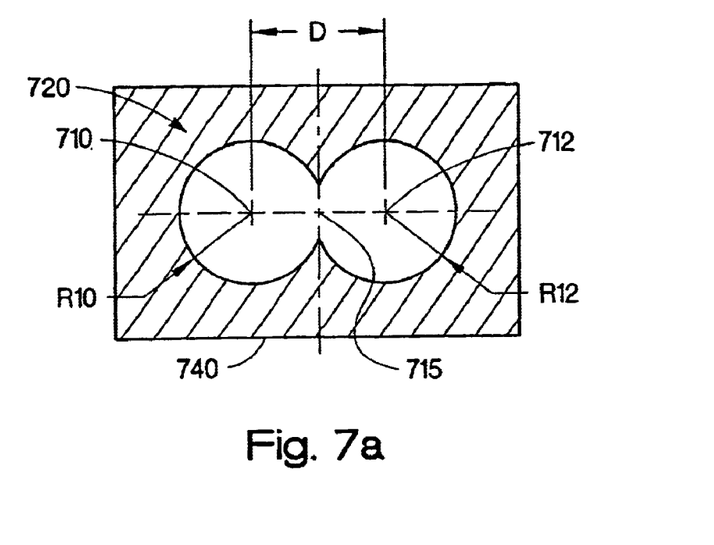
FIG. 7a is a cross-sectional view of the chamber according to an embodiment of this invention.
Figure 7B:
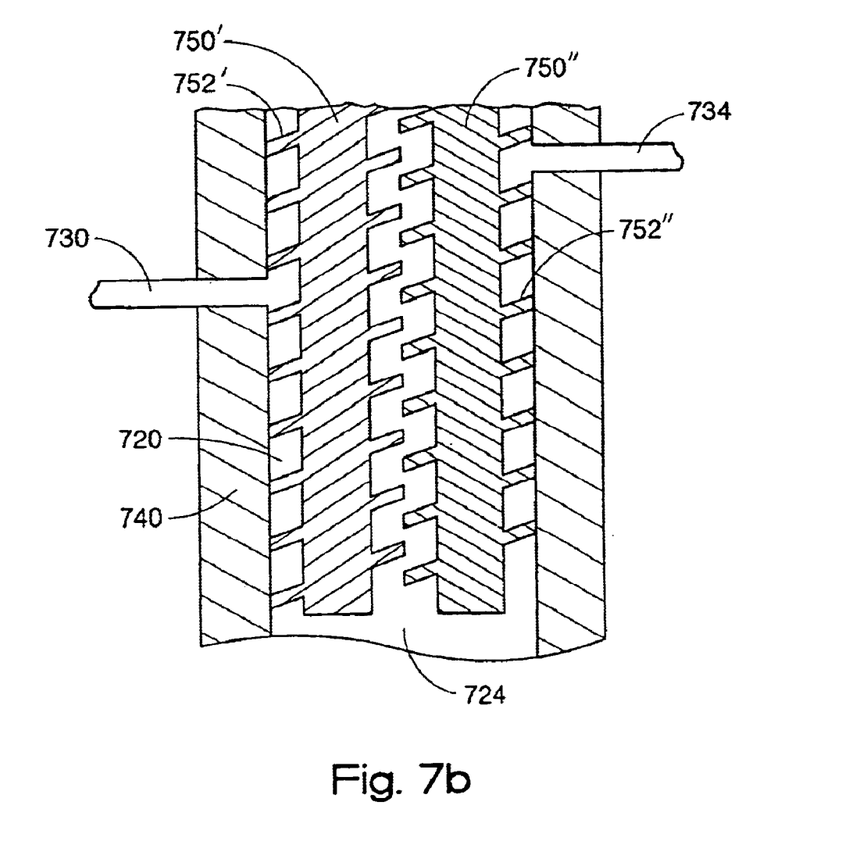
FIG. 7b is a cross-sectional view of the chamber according to an embodiment of this invention.

Referring to FIGS. 7a–7b an alternate embodiment of the present invention is shown, where two feed screws 750' and 750" are located within chamber 720 that includes two non-overlapping cylindrical bores. FIG. 7a shows a cross-sectional view of chamber 720 located in housing 740. In this embodiment, chamber 720 includes two circular bores 710 and 712, having radius R10 and R12 respectively, formed in housing 740 which have parallel axes and extend centrally and longitudinally through housing 740. The distance D between the axis of circularbore 710 and the axis of circular bore 712 is greater than the sum of R10 and R12. Circular bores 710 and 712 communicate with each other through common opening 715. Feed screws 750' and 750" are rotatably supported within circular bores 710 and 712 of chamber 720 as shown in FIG. 7b. Helical threads 752' and 752" in this embodiment are non-overlapping. As feed screws 750', 750" are rotated helical threads 752', 752" cause first and second component liquids 104, 107 in the turns of helical threads 752' and 752" to move in the axial direction causing mixing and the dispensing of liquid product as shown in FIG. 7b. Feed screws 750', 750" can run in two modes: co-rotating and counter-rotating depending on screw design. In addition, feed screws 750', 750" can include sections with various configurations of helical threads. Those skilled in the art will appreciate that kneading threads, reverse threads, variable pitch thread, cylindrical sections with no threads all can be utilized in various combinations as well as numerous other thread designs.

Figure 8:
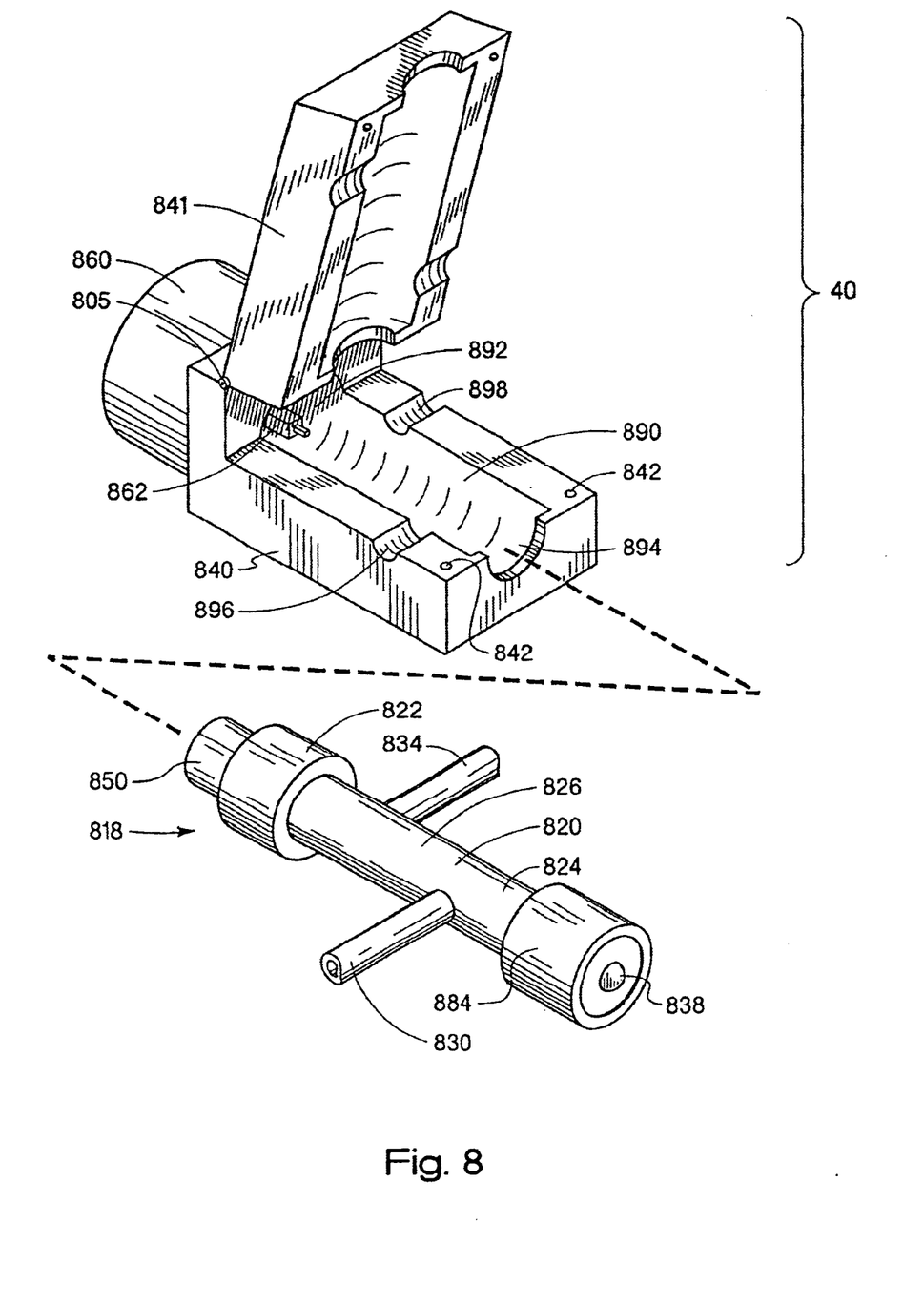
FIG. 8 is a perspective view of a dispensing apparatus according to an embodiment of this invention.

Referring to FIG. 8 an alternate embodiment of the present invention is shown, where housing 40 includes main body portion 840 and front body portion 841. Front body portion 841 is attached to main body portion 840 at pivot point 805 through hinge 845 (not shown) so that front body portion 841 pivots away from main body portion 840 when locking mechanism 846 (not shown) is released. Main body portion 840 and front body portion 841 cooperate to form internal cavity 890 made up of main cavity 891, drive cavity 892, output cavity 894, and first and second input cavities 896, 898. All of these cavities are formed as one half openings in each of main body portion 840 and front body portion 841 for ease of manufacturing and assembly as shown in FIG. 8. Although those skilled in the art will appreciate that these cavities need not be each formed as one half in either main body portion 840 or front body portion 841. Drive shaft 862 of drive mechanism 860 is shown extending into drive cavity 892. Internal cavity 890 are openings for disposable insert 818 as will be described.

Also shown in FIG. 8 is disposable insert 818 which includes feed screw 850 and chamber 820 where chamber 820 consists of three segments first portion 822, second portion 824 and third portion 826. First and second inlet channels 830, 834 extend radially from third portion 826 of chamber 820 and are separated in a direction along the axis of chamber 820 to preclude the interaction of first and second component liquids 104, 106 from either input channel as first and second component liquids are fed into chamber 820 from first and second reservoirs 80, 82 (not shown). Disposable insert 818 is received in housing 40 in internal cavity 890, disposable insert 818 forms a chamber complimentary to internal cavity 890. During mixing and dispensing first and second component liquids are retained in chamber 820 and first and second input channels 830, 834. Therefore, during the normal course of operation the interior walls of disposable insert 818 are the portions wetted by first and second component liquids 104, 106 and liquid product. Thus, under normal operation first and second component liquids 104, 106 and liquid product never contact any of the surfaces of internal cavity 890.

Figure 9A:
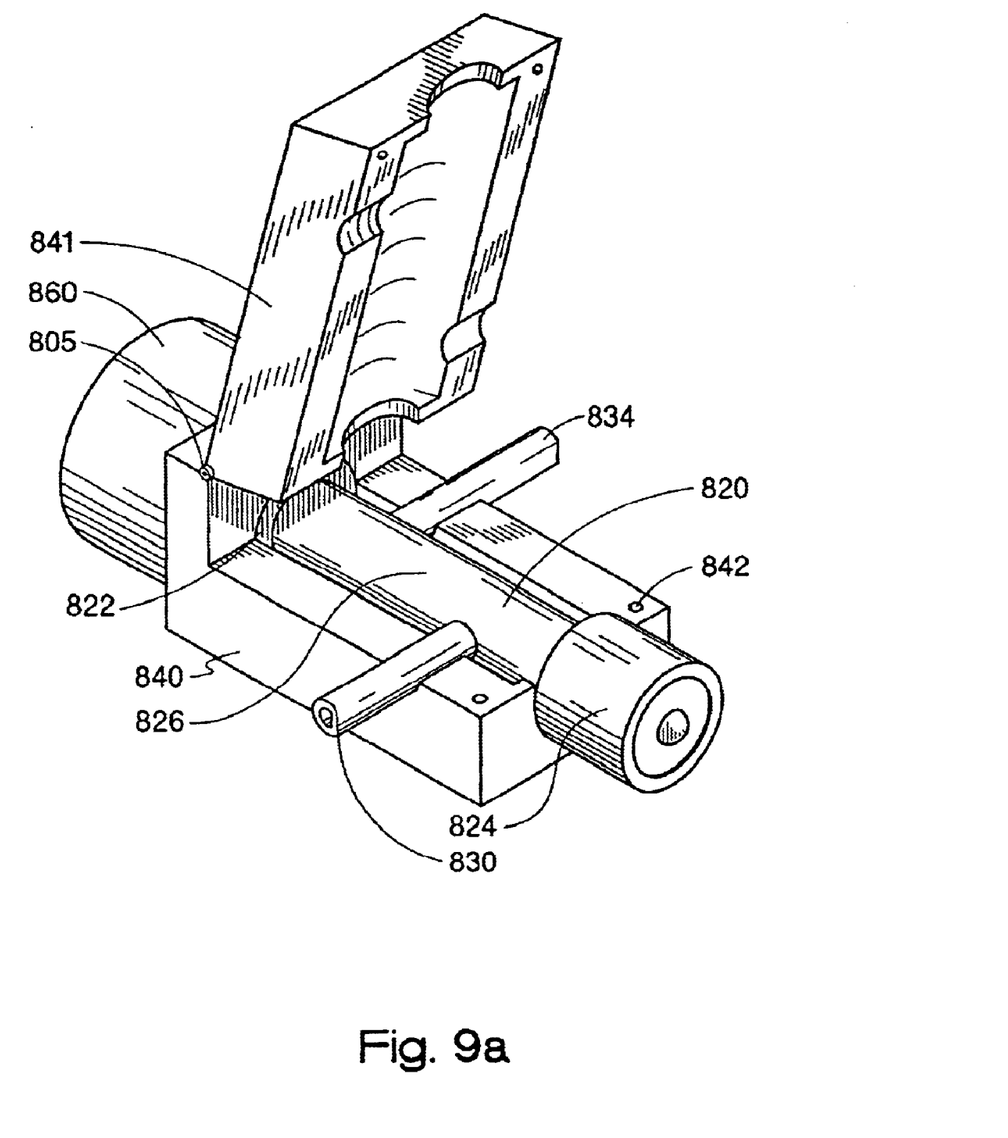
FIG. 9a is a perspective view of a dispensing apparatus showing the disposable insert placed within the open housing according to an embodiment of this invention.
Figure 9B:
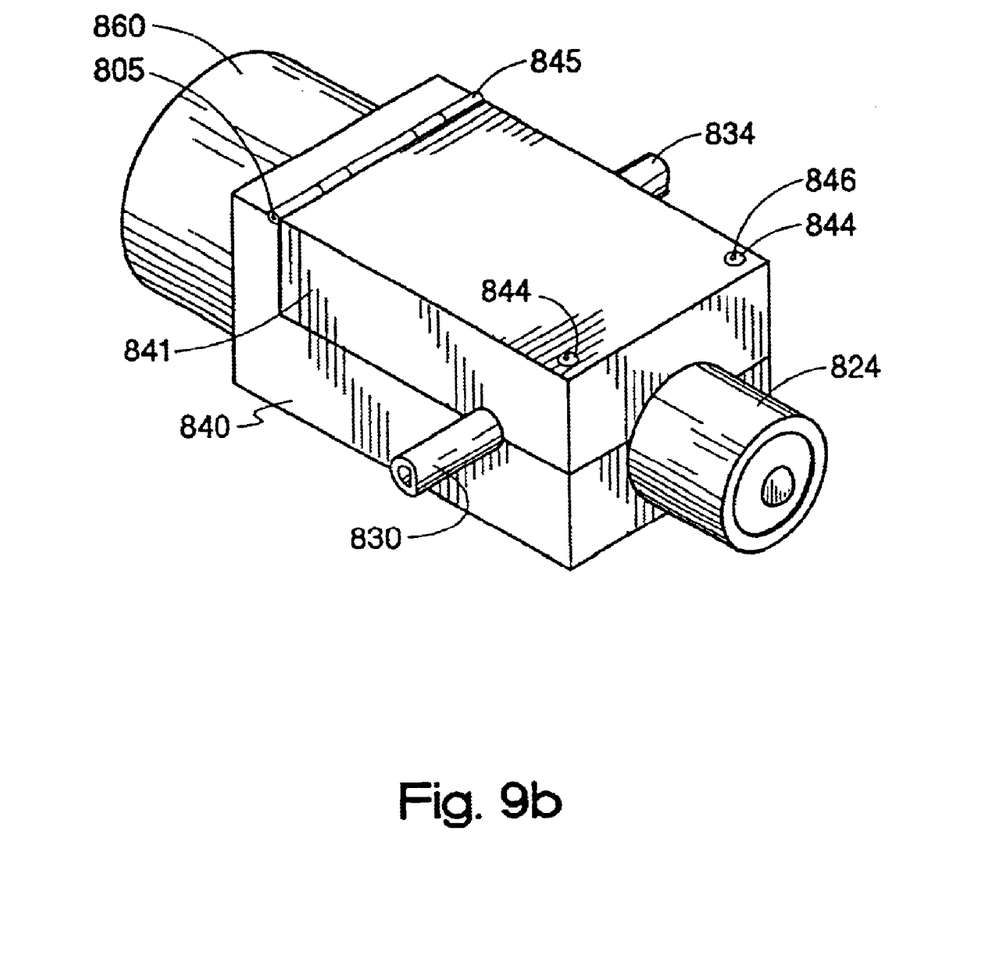
FIG. 9b is a perspective view of a dispensing apparatus showing the disposable insert within the closed housing according to an embodiment of this invention.

Disposable insert 818 is shown in FIG. 9a inserted into housing 40 with front body portion 841 in an open position. FIG. 9b shows front body portion 841 with locking mechanism 846 in a locked position. As shown in FIG. 9b locking mechanism 846 consists of captive screws 844 which are threaded into threaded openings 842 shown in FIG. 9a. Those skilled in the art will readily recognize that there are numerous other locking mechanisms which can be utilized such as a latch as well as others.

Figure 10:
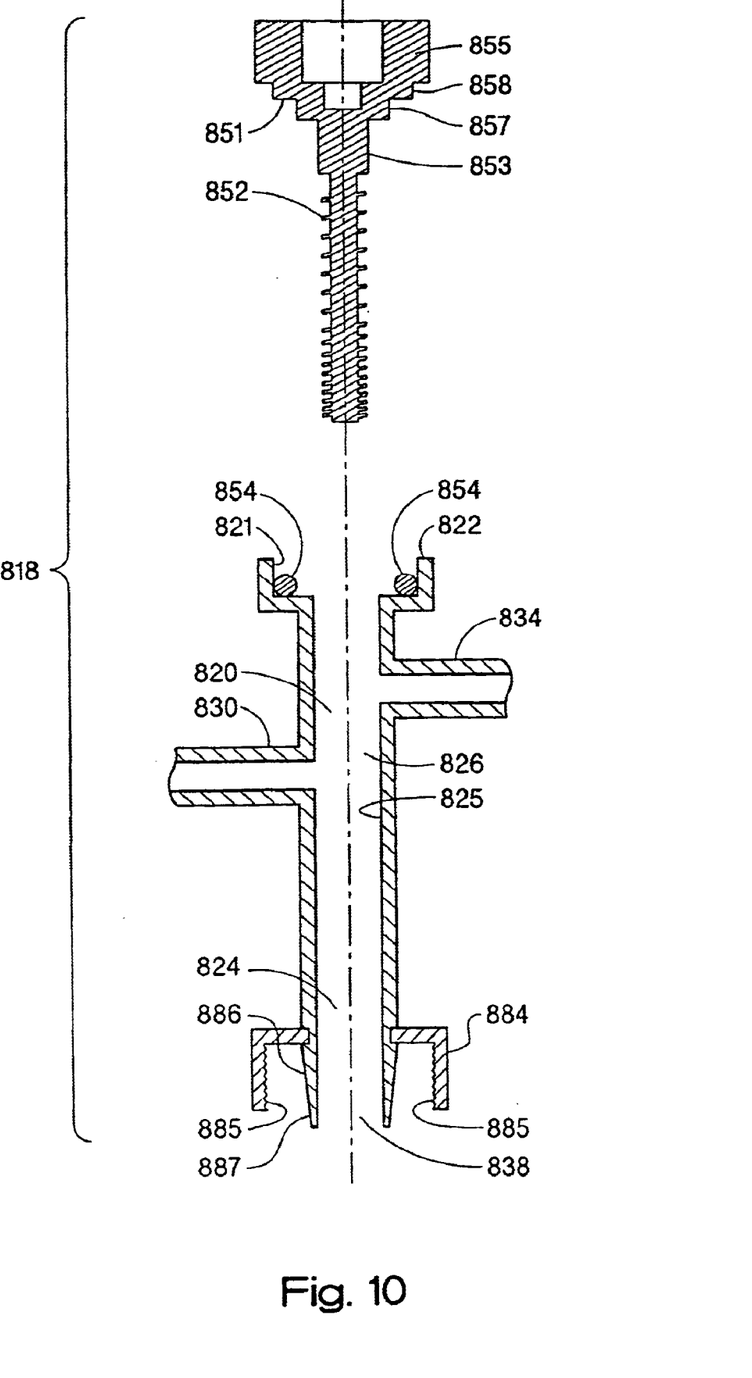
FIG. 10 is a cross-sectional view of a disposable insert according to an embodiment of this invention.

Referring to FIG. 10 an exploded cross-sectional view of disposal insert 818 is shown where drive coupling 855 is sized to be received in drive cavity 892 (shown in FIG. 8). Feed screw shank 853 is to be received in chamber 820 and has a diameter slightly less than the diameter of chamber 820, thus feed screw shank 853 is in sliding contact with side wall 825 of chamber 820. Drive coupling 855 includes drive end 859, second annular shoulder 858, and first annular shoulder 857 all having a diameter somewhat smaller than the previous diameter going from drive end 859 to feed screw shank 853 (i.e. drive end 859 is of a greater diameter than second annular shoulder 858, which is of a greater diameter than first annular shoulder 857, which is of a greater diameter than feed screw shank 853). When feed screw 850 is inserted into chamber 820 an annular cavity is formed by face 851, first annular shoulder 857, and internal wall 821 of first portion 822 of chamber 820. Thus, face 851 compresses rotary seal 854, preferably an elastomeric o-ring seal axially, while the outer surface of first annular shoulder 857 forms an inner sealing surface, and a portion of internal wall 821 forms an outer sealing surface, hindering liquid components from moving into first portion 822 of chamber 820. Internal drive socket 856 is formed in drive coupling 855 so that drive shaft 862 is received within internal drive socket 856 to provide rotational coupling between drive mechanism 860 and feed screw 850.

Helical threads 852 extend over a substantial portion of the length of feed screw 850 beginning near drive coupling 855 and continuing to the opposite end of feed screw 850. Helical threads 852 have a diameter slightly less than the diameter of chamber 820, thus helical threads 852 are in sliding contact with side wall 825 of chamber 820 and helical threads 852 have a wide pitch near feed screw shank 853 the threads becoming narrower and closer together as the threads approach second portion 824. In this embodiment drive mechanism 860 is preferably a servo motor or stepper motor which provides accurate control of the amount of rotation of feed screw 850. Internal drive socket 856 preferably is square, rectangular, or hexagonal, however, those skilled in the art will appreciate that there are numerous other coupling mechanisms such as a screw coupling or keyed coupling as well as others, which can be utilized.

Figure 11:
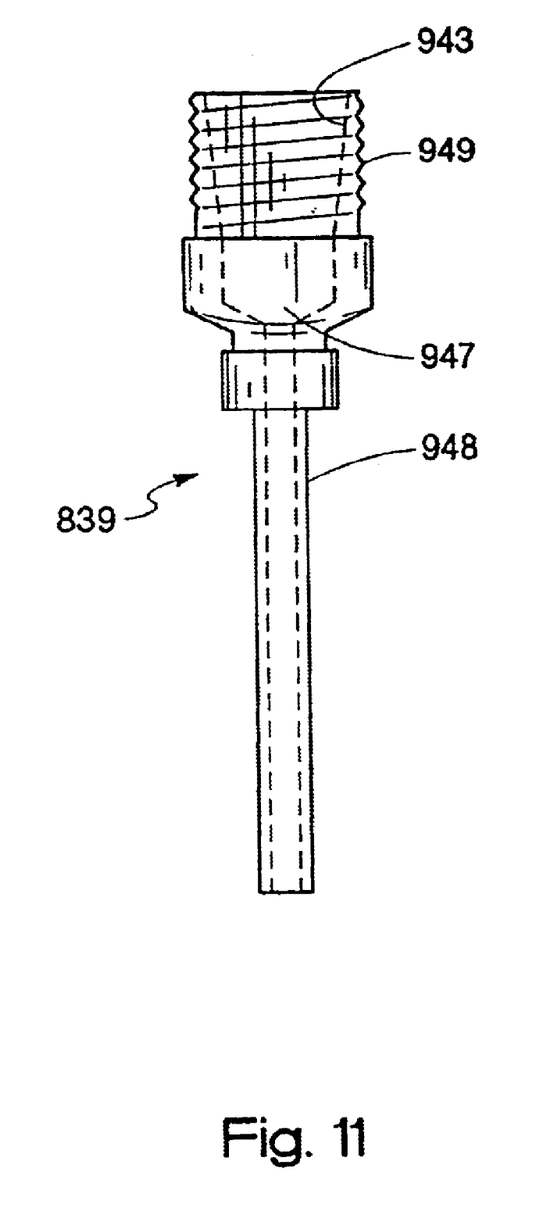
FIG. 11 is a plan view of a dispenser tip according to an embodiment of this invention.

FIG. 10 shows second portion 824 includes outlet cap 884 which extends beyond outlet cavity 894, output channel 838. Threads 885 are formed on the inner surface of outlet cap 884. Upper portion 886, closer to outlet cap 884, is greater in diameter than lower portion 887 forming a tapered shoulder that is used to mount a removable dispenser tip 839 (shown in FIG. 11). Dispenser tip 839, shown as a plan view in FIG. 11 includes blunted needle 948 of appropriate bore diameter to produce the desired size of structure 29. Coupling unit 947 on the upper portion has threaded segment 949 on the outer surface and is tapered on the inner surface 943 to substantially match the tapered shoulder formed in upper and lower portions 886, 887 of second portion 824. Blunted needle 948 is attached to coupling unit 947 which is screwed into outlet cap 884 of disposable insert 818 for easy removal and replacement. Those skilled in the art will readily appreciate that other mounting arrangements may be utilized.

What is claimed is:

1. A dispensing apparatus capable of delivering quantities of a liquid product, comprising:
    a housing having a main body releasably attached to a front body, wherein the main body and the front body form an internal cavity having a main cavity, a drive cavity, an output cavity and two input cavities;
    a disposable insert having a chamber, a first portion, a second portion, and a first and a second input channel wherein the disposable insert conformally fits within the internal cavity of the housing, wherein a first component liquid is delivered through the first input channel to the chamber, and a second component liquid is delivered through the second input channel to the chamber, the first and second input channels disposed to hinder interaction between the first component liquid and the second component liquid in either input channel; and
    at least one feed screw having a helical thread disposed in the chamber, wherein rotation of the at least one feed screw mixes the first and second component liquids to form a liquid product and discharges a precise amount of the liquid product from the chamber.

2. The dispensing apparatus of claim 1, wherein the disposable insert is removable from the housing.

3. The dispensing apparatus of claim 1, wherein the housing further comprises a locking mechanism and a hinge mechanism coupling the main body to the front body.

4. The dispensing apparatus of claim 1, further comprising a disposable dispenser tip in liquid communication with the chamber.

5. The dispensing apparatus of claim 1, wherein the first and second input channels extend radially from the chamber where one input channel is closer to the first portion than the second input channel and the first and second input channels are separated by a least a distance sufficient to preclude interaction, in either input channel, of the first and second component liquids.

6. The dispensing apparatus of claim 1, wherein one input channel descends to the chamber and the second input channel ascends to the chamber, wherein the two input channels are attached to the chamber at a common location and the angle formed by the two input channels is acute.

7. The dispensing apparatus of claim 1, wherein the first and second input channels further comprise an inlet end attached to the chamber and a storage end, wherein a storage reservoir is mounted to the storage end of each input channel.

8. The dispensing apparatus of claim 1, wherein the chamber further comprises a third portion having smoothly varying tapered internal walls, wherein the third portion has a first diameter near the first portion and a second diameter near the second portion wherein the first diameter is greater than the second diameter; and wherein the helical threads of the at least one feed screw are in sliding contact with the internal walls of the third portion of the chamber.

9. The dispensing apparatus of claim 8, wherein the at least one feed screw further comprises helical threads having a linear pitch.

10. The dispensing apparatus of claim 1, wherein the at least one feed screw further comprises two feed screws having helical threads.

11. The dispensing apparatus of claim 10, wherein the chamber further comprises a third portion having a barrel body having two partly overlapping cylindrical bores and the two feed screws are rotatably supported in the two partly overlapping cylindrical bores of the barrel body.

12. The dispensing apparatus of claim 11, wherein the two partly overlapping cylindrical bores have a region of overlap and the two partly overlapping cylindrical bores having internal walls that are substantially parallel, wherein the helical threads of the two feed screws are in sliding contact with the internal walls of the third portion of the chamber and where the helical threads of the two feed screws are intermeshing in the region of overlap.

13. The dispensing apparatus of claim 11, wherein the two feed screws further comprise helical threads having a variable pitch that decreases as the helical threads approach the second portion of the chamber.

14. The dispensing apparatus of claim 10, wherein the chamber further comprises a third portion having a barrel body having two non-overlapping cylindrical bores having internal walls that are substantially parallel and the two feed screws are rotatably supported in the two non-overlapping cylindrical bores of the barrel body, wherein the helical threads of the two feed screws are in sliding contact with the internal walls of the third portion of the chamber and wherein the helical threads of the two feed screws are non-intermeshing.

* * * * *